Figure 3:
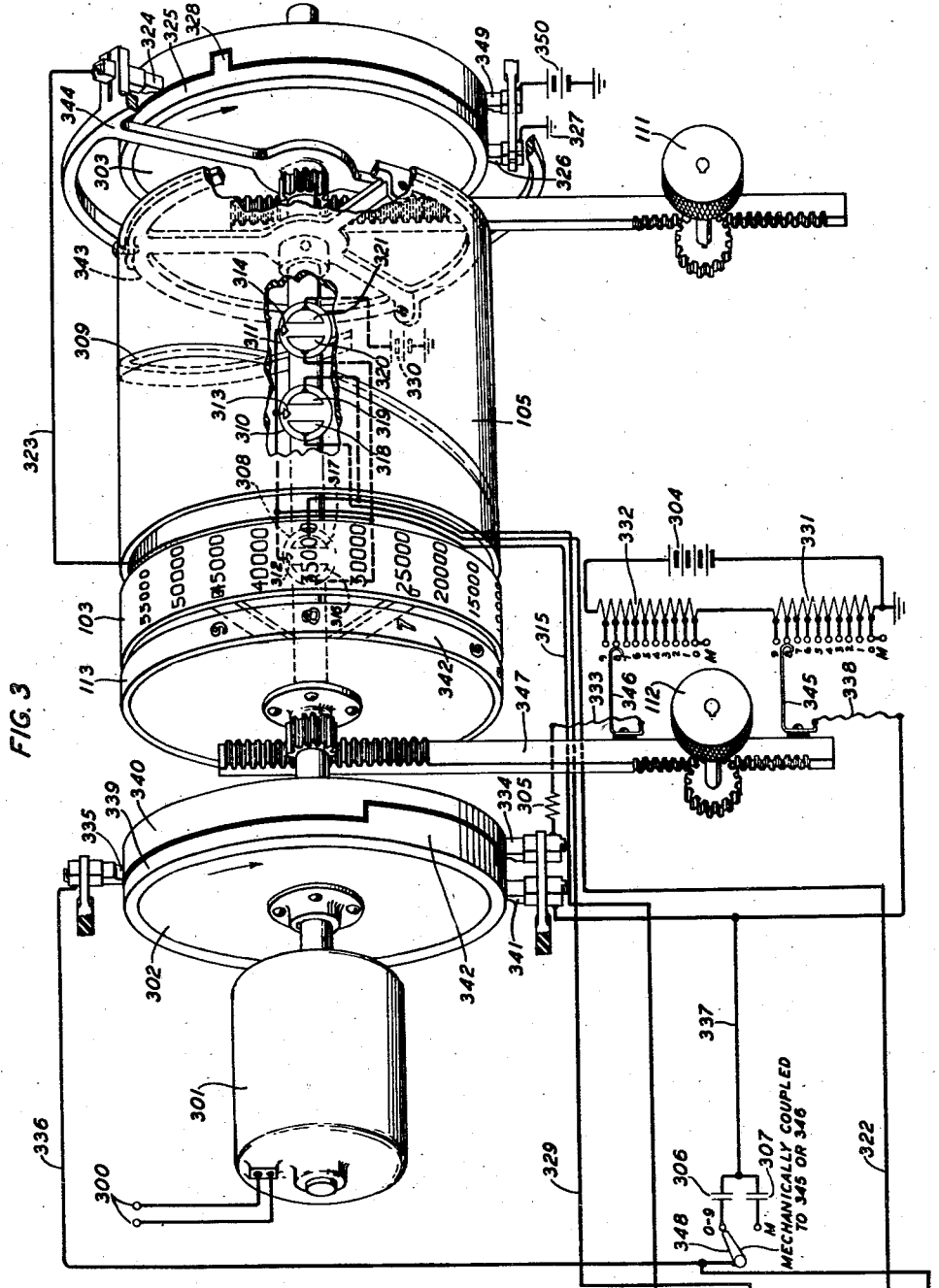

Dec. 9, 1947.  A. M. SKELLETT  2,432,454
MANUAL RANGE GATE FOR STROBOSCOPIC INDICATORS
Original Filed Oct. 9, 1943    2 Sheets-Sheet 1
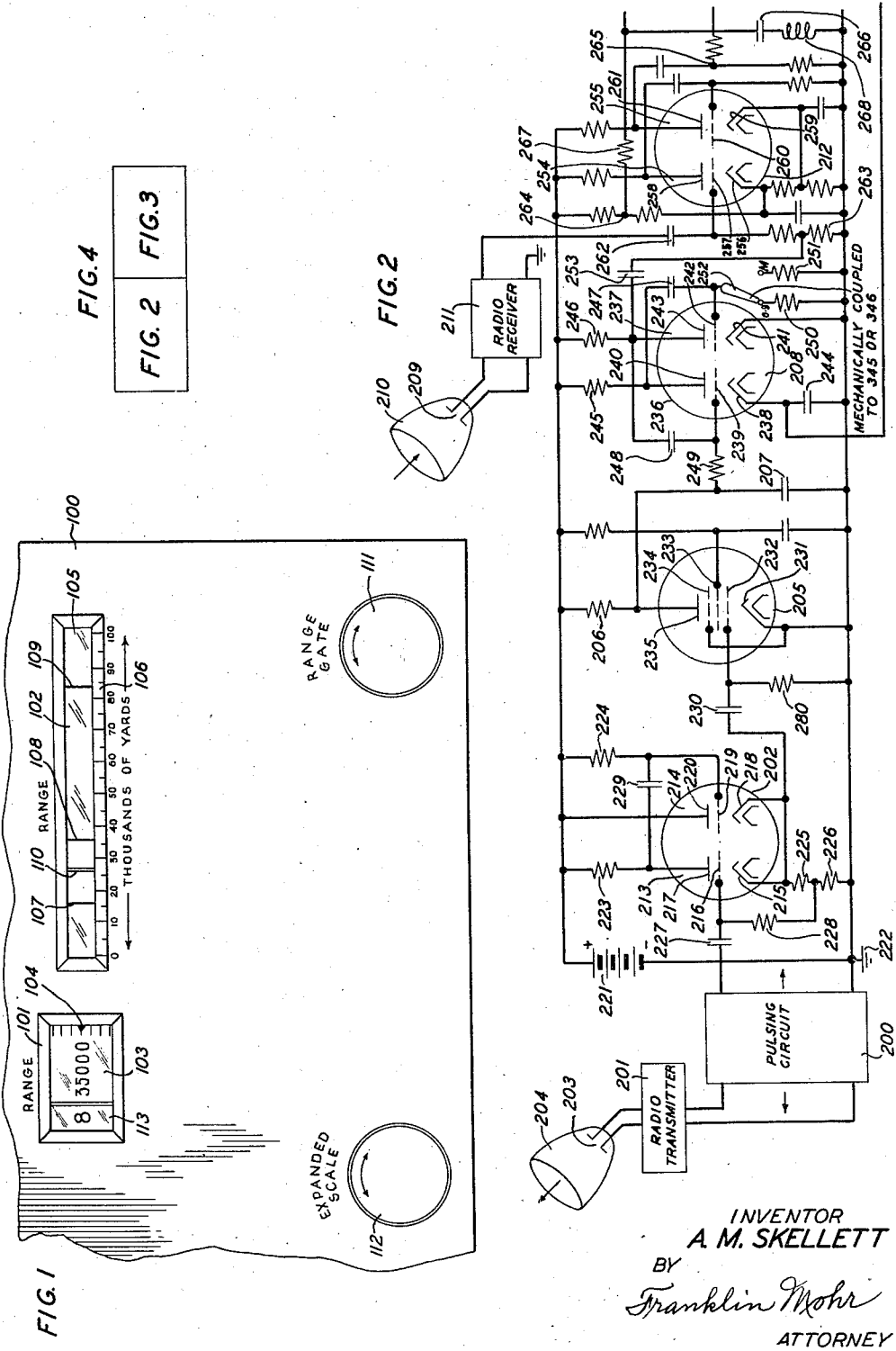
INVENTOR
A. M. SKELLETT
BY
Franklin Mohr
ATTORNEY Dec. 9, 1947.  A. M. SKELLETT  2,432,454
MANUAL RANGE GATE FOR STROBOSCOPIC INDICATORS
Original Filed Oct. 9, 1943  2 Sheets-Sheet 2

INVENTOR
A. M. SKELLETT
BY
Franklin Mohr
ATTORNEY

Patented Dec. 9, 1947

2,432,454

UNITED STATES PATENT OFFICE 2,432,454

MANUAL RANGE GATE FOR STROBOSCOPIC INDICATORS

Albert M. Skellett, Madison, N. J., assignor to Bell Telephone Laboratories, Incorporated, New York, N. Y., a corporation of New York Original application October 9, 1943, Serial No. 505,673. Divided and this application November 8, 1945, Serial No. 627,493

3 Claims. (Cl. 177—337)

This application is a division of my copending application Serial No. 505,673, filed October 9, 1943, assigned to the same assignee as the present application. The invention claimed herein relates to a manual range gate an illustrative embodiment of which is described herein in connection with a stroboscopic indicator such as is disclosed in the said application Serial No. 505,673. The present application also discloses a scale changing system which is claimed in my copending application Serial No. 627,491, filed November 8, 1945, and assigned to the same assignee as the present application.

The stroboscopic type of indicator is designed to replace the cathode-ray type of indicator commonly used in radar systems. The stroboscopic indicator is based on the stroboscopic illumination of moving or rotating scales and dials, the flashes of light being set off by the received reflections. The range, azimuth, and elevation readings may appear in numerical form in windows as if the scales on which the numbers are laid out were stationary at the correct values for the reflecting object in question. Two-dimensional field images such as map-like representations in polar coordinates may also be provided like those produced in cathode-ray tubes but of greater brilliance and size. These may or may not employ screens in which the glow persists momentarily after illumination. Automatic switching may be provided so that the apparatus assigns reflections received from a plurality of objects to different windows which give simultaneous readings.

The invention has among its advantages simplicity, increased ruggedness, low voltage operation, increased accuracy.

A further advantage is the low speed of the rotating parts, which need not exceed 1800 revolutions per minute.

An object of the invention is to reduce personal error in reading the range, azimuth or elevation of the reflecting object, particularly in the case of an unskilled observer.

As used in radar indicators the cathode-ray tube operates by moving a pencil of electrons over a stationary scale, the electron beam being modulated at each sweep to give an indication at the same fixed position on the scale. Thus an apparently stationary mark is observed. The stroboscopic type of indicator operates on a reverse principle. The scale moves at high speed past a fixed index and the illumination of the scale is modulated so as to give a flash of light whenever the correct part of the scale is opposite the index. The effect upon the observer is the same in either case, namely, the appearance of a stationary mark on a stationary scale.

In measuring range by reflected pulses it has not been found practical to use a scale rotating in synchronism with the outgoing pulses and making one revolution per pulse. The reasons for this are, first, that the speed required of the rotating scale is too high, and second, that it is not possible to synchronize a rotating scale with the outgoing pulses in some radar systems because the pulses are not emitted at a uniform time rate.

In accordance with the invention, low speed scales may be used and a considerable amount of "jitter" or irregular spacing of the outgoing pulses may be tolerated.

For the azimuth or elevation scales it is entirely practical to synchronize the scales with the motion of the antenna. At the relatively slow speeds of the azimuth and elevation scales the flicker of the flashes may be observable in some cases but this will present no serious difficulty since the overall effect is that of a stationary dial or scale illuminated with intermittent rather than steady light.

In the drawings, Fig. 1 is an elevational view of the indicator panel in a one-dimensional indicating system embodying the invention; and Figs. 2 and 3 constitute a schematic diagram of the electrical and mechanical apparatus associated with the panel of Fig. 1, when these figures are arranged as in Fig. 4.

One embodiment illustrative of the invention is shown in Figs. 1 to 4, inclusive. This embodiment is restricted to measurement of a single dimension, namely, the range. In a class A representation, horizontal extensions indicate range or distance and a vertical line or mark indicates the location of an object at a distance shown by the horizontal position of the line or mark. Provision is made to display a class A representation of the ranges of several distant objects simultaneously against a calibrated scale from which the approximate range of each object may be read directly, for example in yards. There is also provided a single range dial from which may be obtained a more accurate reading of the range of any desired one of the distant objects. A manual range gate is provided and associated with a movable marker in the class A indicator so that a particular object, the range of which it is desired to register on the range dial, may be readily selected. The object selected may be changed for another whenever desired by repeated manipulation of the range gate. An expanded scale is provided whereby the precision of the range measurement indicated by the range dial may be increased by a predetermined factor when desired, a factor of ten being preferred. The range dial and the class A range indicator comprise rotating elements each of which is stroboscopically illuminated only at those instants when it presents a correct range reading.

Fig. 1 shows the external appearance of the device as it may be arranged for the convenience of an operator. A portion of the indicator panel is shown at 100 and is provided with windows 101 and 102 which may have suitable frames or bezels. Behind the window 101 is mounted a range dial comprising a drum 103, preferably translucent, upon which are place indications such as a numerical scale of ranges. Provision is made for rotating the dial 103 and illuminating it stroboscopically when a correct range indication appears within the window 101 at a stationary index 104 that may be placed before the dial 103 to fix the exact point of reading. Behind the window 102 is provided a rotating drum 105 with a helical mark which is made to appear, when stroboscopically illuminated, as a vertical or nearly vertical line segment showing through the window. A stationary scale 106 is provided for reading the position of the line segment when illuminated. The drum 105 may be illuminated a number of times during each revolution to produce a plurality of lines such as are shown at 107, 108 and 109 to indicate the ranges of objects at different distances. An arbitrarily movable line 110, which may be distinguished from the lines 107 to 109, inclusive, in any suitable way as for example by a different color of illumination, may be provided under manual control of a knob 111 to aid in selecting one of the distant objects the range of which is to be indicated more precisely by the reading of the dial 103. Another knob 112 may be provided to control an expanded scale and the associated indication of a separate dial 113 mounted next to the dial 103 and appearing within the window 101. The dial 113 is stationary except when rotated manually by means of the knob 112 and is illuminated together with the dial 103 by the stroboscopic light source. The mechanism associated with the panel 100 will be described hereinafter with reference to Figs. 2, 3 and 4.

The manner in which the system is manipulated by the operator may be described with reference to Fig. 1, it being assumed that the internal mechanism is operating and has been properly adjusted. First, it will be appreciated that the external appearance of any stroboscopically illuminated device will generally differ from the external appearance of the same device when viewed in ordinary illumination. For convenience in explaining the operation of the system and at the same time to make the view in Fig. 1 consistent with the other figures, it has been chosen to make Fig. 1 a composite view. The window 102 is assumed to be viewed with the drum 105 revolving and stroboscopically illuminated. The operator sees in the window 102 the marks or lines 107 to 110, inclusive, as shown in Fig. 1. The dial 103 is shown as if stationary and under steady illumination. As this dial actually is revolving along with the drum 105 at a rapid rate it would appear blurred and unreadable unless the movable range mark 110 were placed in coincidence with one of the lines 107 to 109, inclusive and the knob 112 were properly set as explained hereinafter. In using the system, the operator, observing the lines 107 to 109, inclusive, decides which one of the objects represented by these lines is of special interest and he turns the knob 111 to move the mark 110 to coincide with the desired line and adjusts the knob 112 properly as explained hereinafter. The dials 103 and 113 are then stroboscopically illuminated to show the range of the selected object legibly and apparently stationary opposite the index 104. Another object may be thereafter selected by turning the knob 111 to bring the mark 110 in coincidence with the second selected line and by readjusting the knob 112 if need be, when the stroboscopic illumination of the dials 103 and 113 will change to display the range of the second object. Within the window 101, an illustrative range reading is shown on the expanded scale, indicating an object at a range of 83,500 yards. This reading could be observed by bringing the mark 110 to coincide with the line 109. To dispense with the expanded scale and use what is commonly called the main scale, the knob 112 may be turned until a numeral 0 appears on the dial 113 and a step further to operate a switching mechanism which may be mechanically coupled to the knob 112 to switch over the electric circuit from a condition termed the expanded scale condition to one termed the main scale condition as hereinafter described.

Figs. 2 and 3 show the mechanism and circuits behind and associated with the panel 100 of the device shown in Fig. 1.

In Fig. 2 a pulsing circuit 200 is shown connected both to an oscillator 201, preferably of ultra-high frequency, and a square wave generator tube 202, which with connected elements will be referred to as the start-stop circuit. The oscillator 201 is connected to a suitable radiating system such as a dipole antenna 203 mounted at the focus of a paraboloidal projector 204. The output of the start-stop circuit is connected to the grid circuit of a vacuum tube 205 in the anode circuit of which is connected a timing resistor 206 and condenser 207. The condenser 207 is also connected in the input circuit of a square wave generator tube 208, which serves as a narrow automatic range gate. For the reception of electromagnetic waves there may be provided a directionally selective receiving system comprising a dipole antenna 209 mounted at the focus of a paraboloidal reflector 210. The antenna 209 is connected to the input of a radio receiver 211 the output of which is combined with the output of the tube 208 in the input circuit of amplifying tube 212.

In Fig. 3 suitable power terminals 300 are shown connected to a motor 301 to the shaft of which are keyed the dial 103, the drum 105 and a pair of rotary switches or commutators 302 and 303. The commutator 302 is connected with a source 304 of direct current and a timing resistor 305 and either one of two condensers 306 and 307. The dial 103 may be translucent and may have mounted within it a flash lamp 308, which may be a neon lamp. The drum 105 may be opaque except for a helical slot 309 which either may be open or may have a filling of a translucent material. Within the drum 105 may be mounted flash lamps 310 and 311, preferably giving different colors of illumination such as a neon lamp 310 and an argon lamp 311.

The broad principle of operation and the salient features of the structure of Figs. 1 to 3, inclusive, will first be briefly given before presenting a more detailed description. The power supplied to the terminals 300 may be conveniently in the form of 60-cycle alternating current to drive a common type of motor at a speed of approximately 1800 revolutions per minute, that is about thirty revolutions per second. This particular speed is not essential but has been found both suitable and convenient. The motor 301 drives the dial 103, the drum 105 and the commutators 302 and 303 directly at this speed. At a preferably more rapid rate, say 200 to 1,000 or more times per second, the pulsing circuit 200 briefly energizes the radio transmitter 201 to deliver a short train of waves to the antenna 203, which train is projected as a pulse of electromagnetic waves from the projector 204. Simultaneously with the energization of the radio transmitter, the pulsing circuit energizes the tube 202 to generate a square-topped pulse used to block the tube 205 and start a charging current in the resistor 206 and condenser 207. The tube 205 and associated timing elements will be hereinafter referred to as the fast timing circuit. The time constant of the circuit is preferably so predesigned that the potential of the condenser 207 will pass through a suitable range of values at a substantially linear time rate during the brief time required for an electromagnetic pulse to travel from the projector 204 to the most distant object the range of which is to be measured and to return to the reflector 210. The commutator 302 is arranged to connect the battery 304 to the other timing circuit comprising the resistor 305 and the condenser 306 to charge the condenser 306 at a rate relatively slow compared with the condenser 207 to cover a similar suitable range of potentials on the condenser 306 during a single revolution of the commutator. This latter timing circuit will hereinafter be referred to as the slow timing circuit. Due to the relatively slow rate of revolution of the mechanical system, it is permissible to facilitate the description by assuming for the time being that the dial 103 and drum 105 remain stationary during the time between two pulses of the pulsing circuit 200. It is also permissible at this point in the description to assume that the potential of the condenser 306 remains constant during the interval between two pulses. Provision is made to compare the potential of the condenser 306 and the potential of the condenser 207 in the grid-cathode circuit of the tube 208. At some instant during the period between successive pulses the potentials of the condensers 306 and 207 will be of the proper relation to each other to unblock the tube 208 and thereby initiate a square-topped pulse therein. The circuit of the tube 208 is preferably so designed that the square-topped pulse produced is one of relatively short duration. The tube 208, however, does not directly connect with the flash lamps but merely energizes or sensitizes the input circuit of the amplifying tube 212. The tube 212 will operate to flash the lamps 308 and 310 only if a reflected pulse is received by the radio receiver 211 during one of the brief intervals when the tube 212 is sensitized. The scale on the dial 103 is so calibrated that when the lamp 308 flashes the correct range of the distant object from which the reflected pulse was received is shown within the window 101 opposite the stationary index 104. The stationary scale 106 adjacent the frame 102 is so calibrated also that when the lamp 310 flashes the portion of the slot 309 which is illuminated and shows through the window 102 is opposite the same range reading on the scale 106 as is simultaneously appearing on the dial 103.

The illumination of the lamp 308 is preferably further restricted under the control of the manual range gate so that the dial 103 will not be illuminated unless the range of the distant object and the setting of the manual range gate agree. The lamp 310 on the other hand is preferably not under the control of the range gate so that it may flash whenever the range of a distant object agrees with the position of the slot 309 with respect to the scale 106. The lamp 311 is preferably entirely independent of the reflected pulses and of the action of the tube 212 and may be controlled solely by the setting of the range gate to flash once per revolution of the drum 105.

Returning now to the effect of the rotation of the mechanical systems, the shaft and attachments will no longer be considered as standing still. During each interval between pulses the dial 103, drum 105 and the commutators 302 and 303 will have moved a small fraction of a revolution and the potential of the condenser 306 will have increased accordingly. The dial 103 and the drum 105 have advanced to a slightly higher range reading. The critical relation of potentials of the condensers 207 and 306 now occurs at a slightly later epoch with respect to the start of the outgoing pulse from the projector 204. As a result the tube 208 will energize the tube 212 at a correspondingly later epoch and the lamps 308 and 310 will flash only in response to an incoming reflected pulse from a somewhat more distant object, the range of which corresponds to the new reading of the dial 103 and drum 105. Accordingly, in each succeeding cycle of the pulsing circuit 200 the lamp control circuits will be energized at the particular epoch which corresponds to the range reading simultaneously presented at the windows by the dial 103 and the drum 105. During each revolution of the mechanical system the lamp control circuits will have been briefly energized successively at a succession of range readings distributed over the total range of the apparatus. When the range reading corresponds to the range of an object the reflected pulses from that object will be enabled to flash the lamps at least once during the revolution. As the speed of rotation is sufficient to provide 30 flashes per second a substantially flickerless scale reading is obtained.

In order that no pulses be lost due to being returned from objects having ranges that lie between the successive range readings for which the lamp control circuits are energized, the automatic range gate should be open each time for a sufficient interval to admit all returning pulses from objects in a zone of a certain width. The ratio of the frequencies of the fast and slow timing circuits determines the width of the zone to be included by the range gate, or, as it may be more briefly termed, the width of the range gate. This should be as wide as the difference in the successive range readings for which the circuits are energized to insure that all reflected pulses will operate the flash lamp. For example, with a motor speed of 30 revolutions per second and a pulsing rate of 2000 pulses per second, the range gate should have a width of about 1½ per cent of the maximum range, or 1500 yards in 100,000 yards. For an expanded scale of ten times the sensitivity of the main scale, the range gate width in this example may be reduced to one-tenth or 150 yards. The actual readings may be more accurate than the frequency ratio indicates, due to the fact that unless the frequencies are exactly commensurate succeeding readings on the same range will vary slightly and the eye will naturally read the average of the values presented by the scale.

The lamp 310 will flash once per revolution for each received pulse and when several pulses are received from objects at different ranges the lamp 310 will flash when the slot 309 is opposite each of a number of different readings on the scale 106 producing a plurality of lines such as 107 to 109, inclusive. The commutator 303 will flash the argon lamp 311 once for every revolution of the drum 105 at a particular angular position which may be controlled by means of the knob 111 to produce an arbitrarily movable mark 110 of a different color from the lines 107 to 109, inclusive. By moving the mark 110 to coincide with one of the lines such as 107 to 109, inclusive, the lamp 308 will be made to flash to show a precise reading of the range corresponding to the particular line selected by the operator.

The purpose of the expanded scale is to cover a restricted group of ranges with a more precise balance of voltages in the input of the tube 208 as well as with a narrower range gate. The particular portion of the scale 106 to be covered by the expanded scale is indicated by the dial 113 which places an additional digit in front of the reading of the scale 103 by means of a mechanism which will be more fully described hereinafter.

The circuits shown in Fig. 2 will now be described in somewhat greater detail.

*Start-stop circuit*

The start-stop tube 202 may contain, in a single envelope, if desired, two triodes 213 and 214, the triode 213 including a cathode 215, a grid 216, and an anode 217 and the triode 214 including a cathode 218, a grid 219 and an anode 220. A supply source 221, such as a battery, may have its negative terminal grounded as at 222. The positive terminal of the source 221 may be connected to the anode 217 through an anode load resistor 223 as well as directly to the anode 220 and through a grid load resistor 224 to the grid 219. The cathodes 215 and 218 may be connected to ground through cathode resistors 225 and 226. The pulsing circuit 200 may be connected to the grid 216 by a blocking condenser 227. A grid resistor 228 is preferably connected between the grid 216 and the common terminal of the cathode resistors 225 and 226. A coupling condenser 229 is provided between the anode 217 and the grid 219.

In the operation of the start-stop circuit, the triode 214 is normally conducting because of the connection of the grid 219 with the positive terminal of the supply source 221 through the resistor 224. The anode-cathode current of the triode 214 flowing through the properly proportioned resistor 225 provides a blocking potential upon the grid 216 which renders the triode 213 normally non-conducting. The connection of the grid 219 to the positive terminal of the source 221 through the resistor 224 renders the grid potential positive with the result that grid current flows through the triode 214 and adds to the biasing current in the resistor 225. The triode 213 has substantially the full supply voltage impressed across between its anode and cathode although, as aforementioned, anode current is blocked by the negative potential impressed upon the grid 216 by the current flowing in the resistor 225. This condition of the start-stop circuit is a stable one but it may be disturbed by the receipt of a pulse from the circuit 200.

The pulsing circuit 200 is preferably arranged to impress a pulse upon the grid resistor 228 through the blocking condenser 227, the pulse being of such polarity as to render the grid 216 more positive with respect to the cathode 215. The pulse is preferably of sufficient strength to overcome the negative bias impressed upon the grid 216 by the resistor 225, thereby rendering the triode 213 conductive. The flow of current from the source 221 through the resistor 223 and the anode-cathode circuit of the triode 213 produces a drop in the potential of the anode 217. As a result, the charged condenser 229 begins to discharge through the resistor 224 and at the same time the condenser 229 effectively places a negative bias upon the grid 219, thereby causing the triode 214 to cut off its own anode-cathode current. The cessation of the current in the triode 214 removes some of the negative bias from the grid 216 and enables the supply source 221 to maintain the anode-cathode current in the triode 213 even though meanwhile the activating pulse from the circuit 200 may have ceased. The condenser 229 continues to discharge through the resistor 224 and when sufficiently discharged, the triode 214 again becomes conductive and its anode-cathode current restores the negative bias in the resistor 225 to cut off the anode-cathode current in the triode 213, thereby returning the start-stop circuit to the original stable condition. The time required for the cycle of operations in the start-stop circuit is determined mainly by the capacitance of the condenser 229 and the resistance of the resistor 224. The cycle may be repeated by supplying successive pulses to the grid 216 from the pulsing circuit 200. The start-stop circuit develops a good square-topped wave between the cathodes 215 and 218 and the ground 222 which wave may be impressed upon the grid of the trigger tube 205 by means of a blocking condenser 230 and a grid resistor 280.

*Fast timing circuit*

The fast timing circuit comprises the vacuum tube 205, the resistor 206 and the condenser 207. The tube may be a pentode having a cathode 231, a control grid 232, a screen grid 233, a suppressor grid 234 connected to the cathode, and an anode 235. The cathode 231 may be grounded and the anode 235 may be connected to the positive terminal of the source 221 through the resistor 206.

In the operation of the fast timing circuit, the grid 232 normally maintains the tube 205 in a conducting condition due to the potential drop across the resistors 225 and 226 being balanced with respect to the grid 232 by a charge on the condenser 230. When the potential across the resistors 225 and 226 falls during the operation of the start-stop circuit, this drop in potential transmitted through the condenser 230 impresses a negative potential upon the grid 232, thereby blocking the tube 205 and permitting charging current to flow to the condenser 207 through the resistor 206. At the end of the square-topped pulse when the potential difference across the resistors 225 and 226 is restored, the grid 232 returns to substantially ground potential, rendering the tube 205 conducting and permitting rapid discharge of the condenser 207 through the tube 205.

*Automatic range gate*

The automatic range gate comprises the square wave generator 208 and associated circuits. The tube 208 may contain, in a single envelope, if desired, two triodes 236 and 237, the triode 236 including a cathode 238, a control grid 239 and an anode 240 and the triode 237 including a cathode 241, a control grid 242 and an anode 243. The cathode 241 may be directly grounded and the cathode 238 may be connected to ground through a coupling condenser 244. The anodes 240 and 243 may be connected to the positive terminal of the source 221 through anode circuit resistors 245 and 246, respectively. The anodes 240 and 243 may be cross-connected to the grids 242 and 239, respectively by coupling condensers 247 and 248. The grid 239 may be connected to the positive terminal of the condenser 207 through a coupling resistor 249. The grid 242 may be connected to ground through either one of two resistors 250 and 251 under the control of a switch 252.

In the operation of the automatic range gate, the potential of the condenser 207 is continuously compared with the potential of a selected one of the condensers 306 and 307 in the grid-cathode circuit of the triode 236. The potential of the condenser 207 acts by virtue of direct connection in the grid-cathode circuit, while the potential of condenser 306 or 307 is impressed upon the cathode 238. The potential of the cathode 238 is thus changing at a slow rate and the potential of the grid 239 is changing at the fast rate. At the start of each fast cycle the grid potential is more negative with respect to that of the cathode 238 than the cut-off voltage of the triode and as it rises this cut-off potential is reached and the triode 236 starts to conduct. Before this critical potential relation is reached the triode 237 is conducting due to the grid 242 being connected to the cathode 241 through one of the resistors 250 and 251, and the coupling condenser 247 contains a charge of substantially the full voltage of the source 221. When the triode 236 becomes conducting, its anode potential falls due to the flow of current in the resistor 245, and this potential drop is impressed on grid 242 through condenser 247, thereby immediately blocking the triode 237. The condenser 247 rapidly discharges through the resistor 250 or 251 removing after a definite interval the blocking potential from the grid 242 and permitting current to flow again. It will be noted that while the triode 237 was blocked, the coupling condenser 248 was being charged through the resistors 246, 249 and the condenser 207. When the triode 237 has resumed conductivity, the charge on the condenser 248 is effectively thrown across between the grid 239 and the cathode 238 to form a blocking potential to aid in restoring the triode 236 to the normal condition. The generator 208 thus produces a square-topped pulse preferably of brief duration which is impressed upon the input circuit of the flashing tube 212. During the normal blocked condition of the triode 236, the triode 237 is conductive and hence the anode 243 may be arranged to be very little above the potential of the cathode 241. During the brief period of blocking in the triode 237, the anode 243 assumes substantially the full battery potential. The potential variation of the anode 243 thus constitutes a narrow square-topped wave of potential. The duration of the narrow pulse may be varied by means of the switch 252 to select one or the other of the resistors 250 and 251 through which to discharge the condenser 247.

*Flashing circuit*

The flashing circuit comprises the tube 212 and associated elements. The square-topped wave from the generator 208 is impressed upon the flashing circuit through a coupling condenser 253. The flashing tube 212 may contain, in a single envelope, if desired, two triodes 254 and 255, the triode 254 including a cathode 256, a grid 257 and an anode 258 and the triode 255 including a cathode 259, a grid 260 and an anode 261. The ungrounded side of the radio receiver 211 may be connected to the grid 257 through a coupling condenser 262 and the output of the automatic range gate may be connected into the grid-cathode circuit of the triode 254 by means of the coupling condenser 253. The tube 212 comprises two stages of amplification. Normally the grid 257 is biased more negative than its cut-off potential so that echoes from the radio receiver cannot get through to operate the flashing lamps 308 and 310. When the range gate is impressed on this grid it brings its potential to cut-off and the echoes, which are of positive potential can then get through to triode 255 where they are amplified for use in triggering off the flash tubes 308 and 310. Thus the tube 212 is operated when a signal is received by the radio receiver 211 provided at the same time the triode 254 is unblocked by the action of the tube 208.

*Flash lamps*

The flash lamps 308, 310 and 311 are preferably of the three-electrode cold type. The tubes 308, 310 and 311 have anodes 312, 313 and 314, respectively, all of which are permanently connected across a condenser 266 and a series inductance 268 through a lead 315 and through the lead 315 and a resistor 267 to a junction point 264 in a potentiometer across the source 221. The tube 308 has a pair of control electrodes 316 and 317 and the tubes 310 and 311 have corresponding pairs of control electrodes 318, 319 and 320, 321. Ground connection is supplied over a lead 322 in a permanent connection to the control electrode 318 of the tube 310 so that this tube will flash whenever an exciting potential is impressed upon its second control electrode 319. Ground connection is supplied to the control electrodes 316 and 320 of the tubes 308 and 311, respectively, through a lead 323, a brush 324, a conductive band 325 of the commutator 303, a brush 326 to ground at 327 only during the passage of the brush 324 over the projection 328 of the band 325. At all other times the brush 324 connects the electrodes 316 and 320 through another brush 349 to a disabling positive potential such as is supplied by a battery 350. The second control electrodes 317 and 319 of the tubes 308 and 310, respectively, are connected through a lead 329 to a junction point 265 in the output circuit of the flashing tube 212. These tubes 308 and 310 receive over the lead 329 a flashing voltage upon receipt of a reflected radio wave by the system at a time when the automatic range gate is open. The control electrode 321 of the tube 311 is permanently connected to the positive terminal of a source 330 illustrated as a battery. The battery 330 becomes effective to flash the tube 311 whenever the ground connection is applied to the other control electrode 320 by the commutator 303.

In the operation of the tubes 308, 310 and 311 it will be evident from the foregoing description of the connections that the tube 311 will be operated once during each revolution of the commutator 303 when the brush 324 crosses the projecting segment 328. The tube 308 will flash provided a radio impulse is received while the automatic range gate and the manual range gate are both set for substantially the correct range. The tube 310 will operate independently of the manual range gate whenever a radio impulse is received during the open condition of the automatic range gate. Each flash of the lamps discharges the condenser 266 which is then recharged at a definite rate through the resistor 267 and the inductor 268 in time for the next flash.

Slow timing circuit

The slow timing circuit comprises the source 300, the motor 301, the commutator 302, the potential source 304, the timing resistor 305 and the timing condensers 306 and 307. The source 304 is connected across a pair of serially connected potentiometers 331 and 332. Assuming the potentiometers 332 and 331 to be set each on step 8 as illustrated, a circuit is formed through a flexible lead 333 to the resistor 305, through a brush 334 on the commutator 302 to another brush 335 and then through a lead 336, to one of the condensers 306 and 307 and then through a lead 337 and a flexible lead 338 to step 8 of the potentiometer 331 and thence to ground. The commutator 302 comprises two conductive bands 339 and 340. The brush 334 runs continually on the band 340 and a brush 341 on the band 339. The brush 335 runs upon the band 340 except during a certain portion of each revolution when the brush 335 rests upon a projection 342 which is an integral of the band 339. While the brush 335 rests upon the projection 342, the condenser 306 or 307 is short-circuited. When, during the revolution of the commutator 302, the projection 342 moves away from the brush 335, the condenser 306 or 307 begins to charge through the resistor 305. The charging of the condenser continues at a substantially uniform rate until the projection 342 is again brought under the brush 335 when the condenser is quickly discharged and made ready for a repetition of the charging cycle. The potentiometers 331 and 332 are preferably so arranged that the effective charging voltage is the same regardless of the steps occupied by the variable contacts of the potentiometers.

Rotating mechanical system

The commutators 302 and 303 are preferably keyed to the shaft of the motor 301. The dial 103 and the drum 105 are preferably fixedly attached to the shaft by suitable means such as spider structures 342 and 343, respectively. The dial 113 is preferably mounted freely on the shaft and may be geared to the knob 112 in known manner as, for example, by means of a suitable combination of racks and pinions. The brush 324 is preferably mounted on a spider structure 344 which rides freely on the shaft and is geared to the knob 111 through another suitable combination of racks and pinions. The remaining brushes are stationary and may be supported in any suitable manner. The lamp 308 may be mounted inside the dial 103 and the lamps 310 and 311 inside the drum 105. The necessary leads to the lamps may be introduced through the space between the dial 103 and the drum 105.

Angular displacement of the rotating parts

In setting the commutators 302 and 303 and the dial 103 and drum 105 on the shaft, the following considerations should be observed as to the relative angular positions of these elements. The dial 103, in a system intended to measure ranges up to 100,000 yards will preferably have a scale reading from 0 to 100,000 occupying a major portion of the periphery of the dial. A blank segment, shown in Fig. 3 for clarity as one-sixth of the complete circle is reserved to cover the interval of time required for the discharge of the slow timing circuit but this interval may be shortened considerably in practice. The helical mark 309 occupies the same proportional part of a complete circumference of the drum 105 as the numerical scale occupies in the complete circumference of the dial 103. The dial 103 and drum 105 are to be set in such a relative angular position that the reading of the dial 103 against the index 104 at the window 101 is identical with the reading of the mark 309 against the scale 106 at the window 102. The angular relation between the commutator 302 and the brush 335, should then be such that when the trailing edge of the segment 342 of the commutator leaves the brush 335, the dial 103 registers zero against the index 104. The angular position of the commutator 303 on the shaft may be determined arbitrarily.

Main scale

When the expanded scale is not in use, the apparatus is said to be operating on the main scale. The potentiometers 331 and 332 are each provided with ten taps or positions, numbered from 0 to 9, inclusive, which are used with the expanded scale. An additional position M is provided adjacent to the zero position for use when operating with the main scale and is directly connected electrically in the potentiometer with the adjacent position 0. Potentiometer arms 345 and 346 for the respective potentiometers 331 and 332 are provided and may be insulatingly attached to a bar 347 in the rack and pinion system operated by the knob 112. In using the main scale the knob 112 is rotated to bring the arms 345 and 346 on to the respective M positions of the potentiometers. This operation results in a rotation of the dial 113 through zero to one position beyond zero, at which position there is no number showing at the window 101. The switches 252 and a switch 348 controlling the selection of the condensers 306 and 307 are preferably mechanically coupled to one of the potentiometer arms 345 or 346 in such a manner that the switches 252 and 348 are both operated whenever the arm 345 passes from the zero position to the M position or vice versa. For the main scale, the switches 252 and 348 are operated into the M position bringing the resistor 251 and condenser 307 into circuit for the main scale and the resistor 250 and condenser 306 for the expanded scale. In operation with the main scale, one terminal of the condenser 307 is grounded so that the potential impressed upon the condenser 244 by the slow timing circuit is simply the potential of the condenser 307. The resistor 251 is proportioned to give the desired width to the automatic range gate. The reading in the window 101 is shown by the number appearing on the dial 103.

Expanded scale

In operation with the expanded scale, when one of the marks such as 107, 108 and 109 appearing at the window 102 has been selected by the operator, the knob 112 is turned to bring the first digit of the range of the selected line into view in the window 101. For example, if the line 109 is chosen (reading approximately 83,000 yards on the scale 106) the digit 8 is brought into view in the window 101, as shown in Fig. 1. This operation moves the potentiometer arms 345 and 346 to the position 8 on the potentiometers 331 and 332, as illustrated in Fig. 3. It also operates the switches 252 and 348 to the 0—9 position, bringing into circuit the resistor 250 and the condenser 306. The condenser 306 is now in series with a potential provided between ground and position 8 of the potentiometer 331 and this potential is added on to the potential of the condenser 306 in the condenser 244 for comparison with the potential in the fast timing circuit. The potential impressed upon the slow timing circuit is the same regardless of the position of the potentiometers, when, as is preferable, the potential between each pair of corresponding positions on the two potentiometers is the same. The resistor 250 is preferably designed to reduce the width of the automatic range gate to one-tenth the value used with the main scale. The condenser 306 is preferably made ten times the capacity of the condenser 307 so that during the period of a single revolution the condenser 306 will acquire a potential only one-tenth as great as that attained by the condenser 307 when using the main scale. The potential difference between two adjacent positions of the potentiometers is thus spread out by means of the condenser 306 to occupy a complete cycle of the slow timing circuit. The reading in the window 101 is comprised by the reading of the dial 103 prefixed by the digit exhibited by the dial 113.

In the system as illustrated, switching over to the expanded scale expands the range covered by the drum 105 and the images in the long window 102. The scale 106 will then represent hundreds of yards instead of thousands as for the main scale and as the knob 112 is turned the portion of the total range covered by the scale 106 will be moved along the total range along with the indication of the dial 113.

What is claimed is:

1. A manual range gate comprising a rotatable commutator having a short segment and a long segment, a rotatable range scale, means to rotate said commutator and said range scale in synchronism, two brushes making contact with said commutator, the first of said brushes being stationary and continuously in electrical contact with the short segment of the commutator, and the second of said brushes being rotatably adjustable with respect to the axis of said commutator and in electrical contact with the short segment and the long segment alternately, means to illuminate said range scale, means connected to said commutator brushes to disable said range scale illuminating means while the said second brush is on the long segment and to sensitize said illuminating means when said second brush is on the short segment, whereby the range value for which the range scale may be illuminated may be controlled by adjusting the angular position of said second brush.

2. A manual range gate comprising a rotatable range scale, a fixed index therefor, a rotatable commutator having a short segment and a long segment, means to rotate said range scale and said commutator in synchronism with a predetermined constant angular relationship between the said range scale and the short segment of said commutator, two brushes making contact with said commutator, the first of said brushes making uninterrupted electric contact with the said short segment, and the second of said brushes making electric contact with the short segment and the long segment alternately, means to adjust the angular relation between the said second brush and the said fixed index of the range scale during the rotation of said range scale and commutator, flashing means to illuminate said range scale and index, means connected electrically with said brushes to disable said flashing means whenever the said second brush is in contact with said long segment and to sensitize said flashing means whenever the said second brush is in contact with the said short segment, whereby the range for which the flashing means is sensitized may be controlled by adjusting the angular position of the said second brush.

3. A manual range gate comprising a rotatable range scale, a fixed index mounted independently of said range scale and adjacent thereto, flashing means to illuminate said range scale and index for stroboscopic reading of said scale in motion, a rotatable commutator having a short segment and a long segment, means to rotate said range scale and said commutator in synchronism and to maintain a constant angular relationship therebetween, a brush mounted independently of said commutator and in slidable electric contact therewith, means to adjust the angular relationship between said brush and the said fixed index during rotation of said range scale and commutator, means electrically connecting said brush to said flashing means, means movably and electrically connected to said short segment to sensitize said flashing means, and means movably and electrically connected to said long segment to disable said flashing means.

ALBERT M. SKELLETT.